United States Patent
Kuo et al.

(10) Patent No.: US 9,652,102 B2
(45) Date of Patent: May 16, 2017

(54) TOUCH PANEL (71) Applicant: MStar Semiconductor, Inc., Hsinchu Hsien (TW)

(72) Inventors: Chao-Yang Kuo, Hsinchu County (TW); Kai-Ting Ho, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 24 days.

(21) Appl. No.: 14/874,903

(22) Filed: Oct. 5, 2015

(65) Prior Publication Data
US 2017/0038864 A1 Feb. 9, 2017

(30) Foreign Application Priority Data
Aug. 7, 2015 (TW) .............................. 104125776 A (51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04103* (2013.01)

(58) Field of Classification Search
None
See application file for complete search history.

(56) References Cited

U.S. PATENT DOCUMENTS 8,502,796 B1* 8/2013 Yilmaz ................... G06F 3/044
178/18.06
2013/0155490 A1* 6/2013 Zhang ..................... G06F 3/041
359/296

FOREIGN PATENT DOCUMENTS

TW 201409497 3/2014
TW 201413514 4/2014

* cited by examiner

*Primary Examiner* — Nicholas Lee
(74) *Attorney, Agent, or Firm* — WPAT, PC; Justin King (57) ABSTRACT

A touch panel includes a plurality of touch sensing groups. Each of the touch sensing groups includes a central electrode, a plurality of first electrodes and a plurality of second electrodes. The central electrode includes a main body, and has a wavy contour. The first electrodes and the second electrodes are disposed at two sides of the main body along a direction, respectively. Each of the first electrodes includes a first inner edge adaptively spaced from a first edge of the central electrode. Each of the second electrodes includes a second inner edge adaptively spaced from a second edge of the central electrode. One first electrode of the first electrodes overlaps two adjacent second electrodes of the second electrodes in another direction.

11 Claims, 7 Drawing Sheets

TOUCH PANEL

This application claims the benefit of Taiwan application Serial No. 104125776, filed Aug. 7, 2015, the subject matter of which is incorporated herein by reference.

BACKGROUND OF THE INVENTION

Field of the Invention

The invention relates in general to a touch panel, and more particularly to a touch panel that utilizes one single transparent conductive pattern layer to form a touch sensing element.

Description of the Related Art

With the fast progress of technologies, touch panels, featuring human-machine interactions, are extensively applied in electronic products including smart phones, GPS navigator systems, tablet computers and laptop computers. A touch sensing element in a conventional touch panel is formed by a plurality of driving electrodes and a plurality of sensing electrodes that are in a staggered arrangement. To prevent the two from electrical connection, the driving electrodes and the sensing electrodes are respectively formed from two conductive layers. As such, in a conventional touch panel, positions of these two conductive layers need to be aligned using an alignment machine during the manufacturing process, hence likely causing an alignment precision issue. Further, an insulating layer needs to be additionally provided between the conductive layers to insulate the two from each other. Moreover, when the touch panel is integrated with a display panel, an image of the display panel needs to penetrate through a larger number of conductive layers, leading to degraded brightness and quality of a display image.

SUMMARY OF THE INVENTION

It is a primary object of the present invention to provide a touch panel for enhancing alignment precision and reducing thickness.

A touch panel is provided according to an embodiment of the present invention. The touch panel includes a substrate and a plurality of touch sensing groups. The touch sensor groups are arranged on the substrate along a first direction. Each of the touch sensing groups includes a central electrode, a plurality of first electrodes and a plurality of second electrodes. The central electrode includes a main body, a first edge and a second edge. The main body has a wavy contour, extends towards one side of the substrate, and includes a first side and a second side opposite each other. The first edge is located at the first side of the main body, and the second edge is located at the second side of the main body. The first electrodes are disposed at the first side of the main body along a second direction. Each of the first electrodes includes a first inner edge adaptively spaced from the first edge of the central electrode. The second electrodes are located at the second side of the main body. Each of the second electrodes includes a second inner edge adaptively spaced from the second edge of the central electrode. One first electrode of the first electrodes overlaps two adjacent second electrodes of the second electrodes in the first direction.

In addition to providing higher precision in relative positions of the electrodes, reduced thickness of the touch panel and enhanced sensitivity of the touch panel or reduced numbers of the conducting lines, by further designing the main bodies of the central electrodes as having wavy contours, the touch panel of the present invention improves the issue that the movement track of a touching object detected by the touch panel does not match the actual movement track of the touching object to further improve the touch quality and accuracy of the touch panel.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
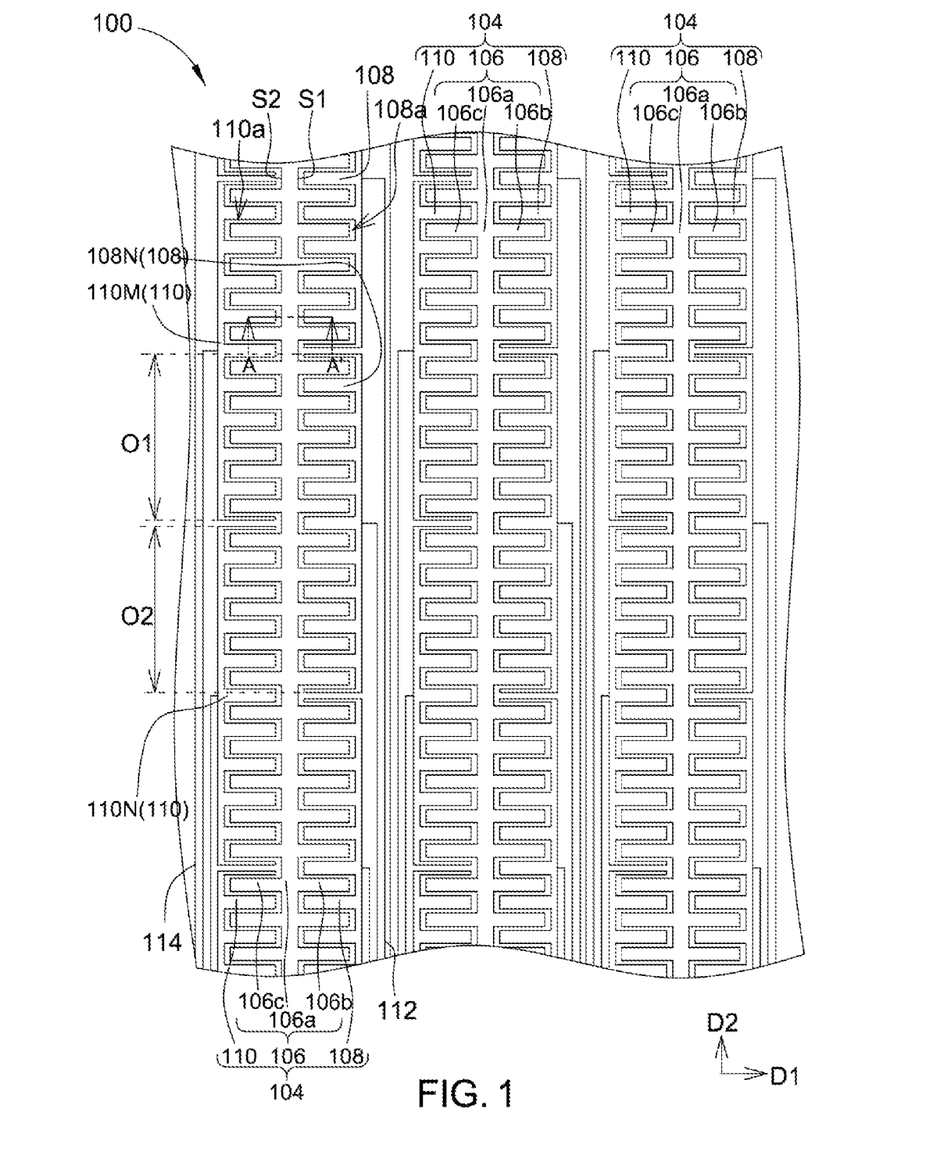
FIG. 1 is a top view of a touch panel according to a first embodiment of the present invention.
Figures 2, 3:
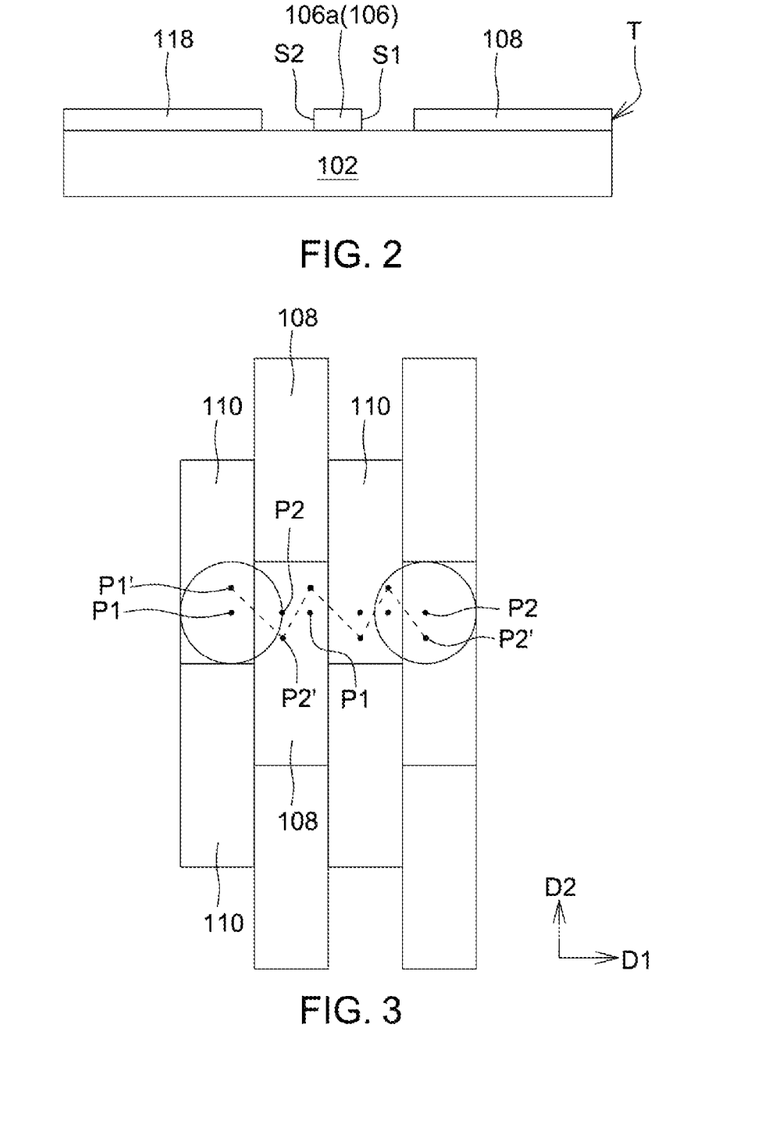
FIG. 2 is a section view of FIG. 1 along a section line A-A'.
FIG. 3 depicts a position change that a touch panel detects for a touching object moving along a straight line parallel to a first direction on the touch panel according to the first embodiment of the present invention.

FIG. 1 shows a top view of a touch panel according to a first embodiment of the present invention. FIG. 2 shows a section view of FIG. 1 along a section line A-A'. As shown in FIG. 1 and FIG. 2, a touch panel 100 includes a substrate 102 and a plurality of touch sensing groups 104. The touch sensing groups 104 are arranged along a first direction D1 on the substrate 102. In the embodiment, for example but not limited to, the substrate 102 may be a transparent substrate, e.g., a glass substrate, a reinforced glass substrate, a quartz substrate, a sapphire substrate or a plastic substrate, or a substrate or panel disposed with elements, e.g., an array substrate, a color filter plate substrate or an organic light emitting diode (OLED) display panel. That is, the touch panel of the present invention may simultaneously serve as a display panel instead of being used solely for touch control. Further, in addition to being disposed outside the display panel, the touch sensing groups of the present invention may also be directly formed on or in the display panel. Further, the substrate 102 may be defined to include an active region and a border region. The active region corresponds to a display region of the display panel, and the touch sensing groups 104 may be disposed on the substrate 102 in the active region. The border region may be used for disposing touch control elements or other opaque elements.

Each of the touch sensing groups 104 includes a central electrode 106, a plurality of first electrodes 108 and a plurality of second electrodes 110. The central electrode 106 includes a main body 106a in form of a straight strip and extending along a second direction D2 different from the first direction D1. For example, the first direction D1 is the horizontal direction, and the second direction D2 is the vertical direction. The main body 106a includes a first side and a second side opposite each other. For example, the first side and the second side may respectively be the right side and the left side of the main body 106a shown in FIG. 1. In the embodiment, each of the central electrodes 106 may further include a first edge S1, a second edge S2, a plurality of first strip portions 106b and a plurality of second strip portions 106c. In each central electrode 106, the first edge S1 and the first strip portions 106b may be located at the first side of the main body 106a, and the second edge S2 and the second strip portions 106c may be located at the second side of the main body 106a. More specifically, the first strip portions 106a protrude from an edge of the first side along the second direction D2 to form the first edge S1, and the second strip portions 106c protrude from an edge of the second side along the second direction D2 to form the second edge S2.

In each of the touch sensing groups 104, the first electrodes 108 are disposed at the first side of the main body 106a, and are arranged along the second direction D2. In the embodiment, each of the first electrodes 108 includes a plurality of first gaps 108a. In each of the touch sensing groups 104, the first gaps 108a are disposed facing the central electrode 106, and each of the first strip portions 106b is disposed in one of the first gaps 108a. More specifically, each first strip portion 106b is disposed in one single first gap 108a, and each first gap 108a is disposed with one single first strip portion 106b therein. That is to say, the first strip portions 106b are respectively disposed in the first gaps 108a in a one-on-one corresponding relationship.

Further, the second electrodes 110 are disposed at the second side of the main body 106b, and are arranged along the second direction D2. In the embodiment, each of the second electrodes 110 may include a plurality of gaps 110a. In each of the touch sensing groups 104, the second gaps 110a are disposed facing the central electrode 106, and each of the second strip portions 106c is disposed in one of the second gaps 110a. More specifically, each strip portion 106c is disposed in one single second gap 110a, and each second gap 110a is disposed with one single second strip 106c therein. That is to say, same as the arrangement relationship of the first strip portions 106b and the first gaps 108a, the second strip portions 106b are respectively disposed in the second gaps 108a in a one-on-one corresponding relationship. Further, the first electrodes 108 and the second electrodes 110 are separated from the central electrode 106. Preferably, first distances between the first electrodes 108 of each of the touch sensing groups 104 and the central electrode 106 may be equal, second distances between the second electrodes 110 and the central electrode 106 may also be equal, and the first distances and the second distances may be equal. Thus, coupling capacitance values generated between the central electrode 106 and the first electrodes 108 and the second electrodes 110 may be the same. In other embodiments, the first electrodes and the second electrodes may have different first gaps and second gaps, respectively.

Each of the touch sensing groups 104 further includes a plurality of conducting lines 112 and a plurality of second conducting lines 114. Each of the first conducting lines 112 electrically connects to one of the first electrodes 108, and extends from an outer edge of the first electrodes 108 along an extension direction of the central electrode 106 to a border region at one side of the touch panel 100. Each of the second conducting lines 114 electrically connects to one of the second electrodes 110, and also extends from an outer edge of the second electrodes 110 along the extension direction of the central electrode 106 to a border region at one side of the touch panel 100. The first conducting lines 112 and the second conducting lines 114 may collectively gather at a border region at the same side of the touch panel 100 to facilitate electrical connection to a circuit board, a control element or a chip. More specifically, each first conducting line 112 electrically connects to one single first electrode 108, and each first electrode 108 also electrically connects to one single first conducting line 112. Similarly, each second conducting line 114 electrically connects to one single second electrode 110, and each second electrode 110 also electrically connects to one single second conducting line 114. That is to say, the first conducting lines 112 respectively electrically connect to the first electrodes 108 in a one-on-one corresponding relationship, and the second conducting lines 114 also respectively electrically connect to the second electrodes 110 in a one-on-one corresponding relationship.

It should be noted, when a touching object approaches or touches the touch panel 100, a sensing capacitance is formed among the central electrode 106, the first electrode 108 and the second electrode 110 corresponding to the touching object, and the touching object to further generate a capacitance change, and a position of the touching object can be detected through the change. In the embodiment, the central electrodes 106, the first electrodes 108 and the second electrodes 110 may be formed from a same transparent conductive pattern layer T, and relative positions of the central electrodes 106, the first electrodes 108 and the second electrodes 110 may be defined through directly defining a photomask or a mask of the transparent conductive layer. Therefore, compared to a relative alignment method of an alignment machine, the relative positions of the embodiment are provided with higher precision. Further, no additional insulating layer is needed between the conductive layers, such that the thickness of the touch panel can be reduced and the brightness and quality of the touch panel can be enhanced. In the embodiment, for example but not limited to, the first conducting lines 112 and the second conducting lines 114 may also be formed from the transparent conductive pattern layer T. In other embodiments, the first conducting lines and the second conducting lines may also be formed from other transparent conductive pattern layers or opaque conductive pattern layers.

In the embodiment, instead of being horizontally aligned, the first electrodes 108 and the second electrodes 110 are in a staggered arrangement, in a way that one of the first electrodes 108 overlaps two adjacent electrodes 110 in the first direction D1. Preferably, the second electrodes 110 and the first electrodes 108 have the same contours and sizes, and overlapping parts of the first electrode 108 and the two adjacent electrodes 110 in the first direction are equal. Taking the first electrode 108N of the first electrodes 108 in the touch sensing group 104 for example, the first electrode 108N corresponds to two adjacent second electrodes 110M and 110N, the first electrode 108N and the second electrode 110M have a first overlapping length O1 in the first direction D1, the first electrode 108N and the second electrode 110N have a second overlapping length O2 in the first direction D1, and the first overlapping length O1 is equal to the second overlapping length O2.

It should be noted that, because the first electrodes 108 and the second electrodes 110 of the touch sensing groups 104 are in a staggered arrangement, the sensitivity of the touch panel 100 of the embodiment may be enhanced or the numbers of the first conducting lines 112 and the second conducting lines 114 may be reduced. That is to say, without changing the lengths of the first electrodes 108 and the second electrodes 110 in the second direction D2, through the staggered arrangement, the touch panel 100 of the embodiment effectively enhances the sensitivity, i.e., reducing a size limit of a touching object detectable to the touch panel 100. Given the size limit of a touching object detectable to the touch panel 100 is unchanged, the touch panel 100 of the embodiment is capable of reducing the numbers of the first electrodes 108 and the second electrodes 110 to further reduce the numbers of the first conducting lines 112 connecting the first electrodes 108 and the second conducting lines 114 connecting the second electrodes 110, and is also capable of reducing distances between every two adjacent central electrodes 106, i.e., reducing the width of the touch sensing groups 104 in the first direction D1.

The touch panel 100 determines a position of a touching object according to a ratio of sensing capacitance values of center positions of the first electrode 108 and the second electrode 110 to a total sensing capacitance value, and the sensing capacitance values of the first electrode 108 and the second electrode 110 are directly proportional to overlapping areas of the touching object and the first electrode 108 and the second electrode 110. However, the position that the touch panel 100 of the first embodiment detects for a touching object moving in a horizontal straight line produces fluctuating position changes. In other words, the movement track of the touching object detected by the touch panel 100 does not match the actual movement track of the touching object. More specifically, FIG. 3 depicts position changes that the touch panel 100 of the first embodiment detects for a touching object moving in a straight line parallel to the first direction. To clearly show the overlapping regions between the touching object and the electrodes, for example but not limited to, FIG. 3 shows conditions where the first electrodes 108 and the second electrodes 110 do not include the first gaps and the second gaps. As shown in FIG. 3, a center of the touching object moves in a straight line along the first direction D1 from P1 to P2. When the center of the touching object is located at P1, the overlapping area of the touching object and the second electrode 110 is larger than the overlapping area of the touching object of and the first electrode 108. Thus, when the center of the touching object is located at P1, a position P1' detected by the touch panel 100 is displaced upwards relative to the center P1 of the touching object along the second direction D2. When the center of the touching object is located at P2, the overlapping area of the touching object and the second electrode 110 is smaller than the overlapping area of the touching object and the first electrode 108. Thus, the position detected by the touch panel 100 is approximately P2', which is slightly displaced downwards relative to the center P2 of the touching object along the second direction D2. As a result, the movement track of the touching object detected by the touch panel 100 does not match the actual movement track of the touching object.

Figure 4:
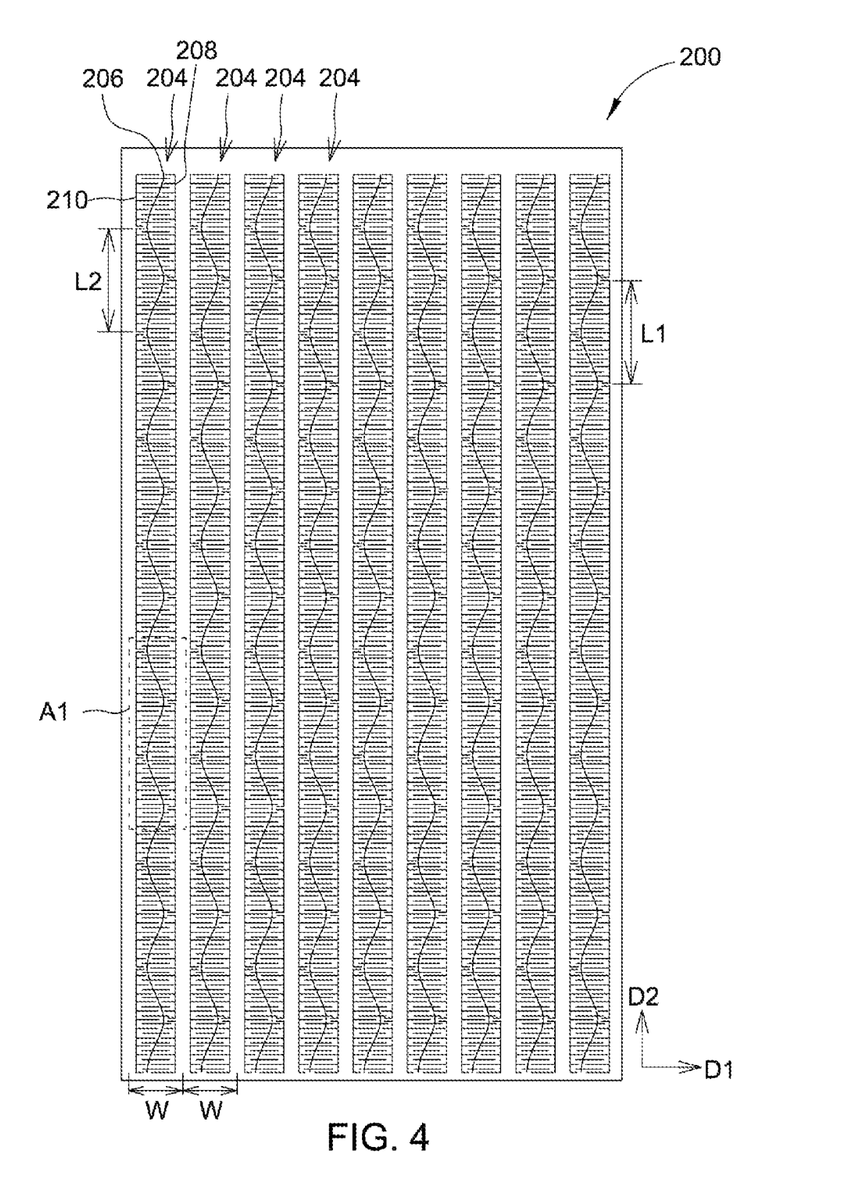
FIG. 4 is a top view of a touch panel according to a second embodiment of the present invention.
Figure 5:
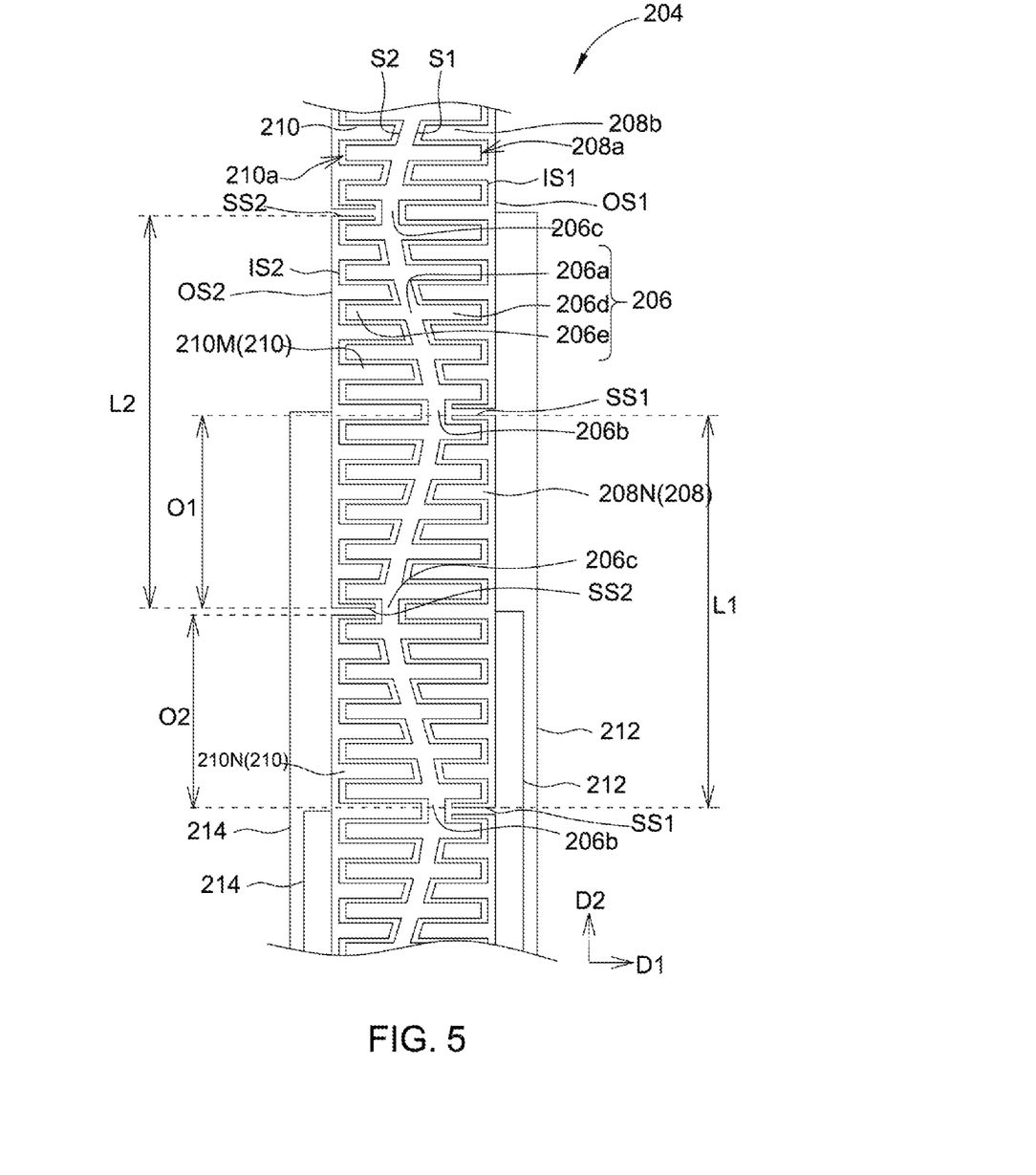
FIG. 5 is an enlarged view of a region A1 in FIG. 4.

To solve the above issue, the present invention further provides another touch panel. FIG. 4 shows a top view of a touch panel according to a second embodiment of the present invention. FIG. 5 shows an enlarged view of a region A1 in FIG. 4. As shown in FIG. 4 and FIG. 5, one difference of the embodiment from the first embodiment is that, main bodies 206a of a touch panel 200 of the embodiment has a wavy contour. More specifically, the touch panel 200 of the embodiment also includes a plurality of touch sensing groups 204 arranged along the first direction D1 on a substrate. Details of the substrate are identical to those of the first embodiment, and shall be omitted herein. Further, each of the touch sensing groups 204 includes a central electrode 206, a plurality of first electrodes 208 and a plurality of second electrodes 210. The central electrode 206, the plurality of first electrodes 208 and the plurality of second electrodes 210 may be formed from a transparent conductive pattern layer, which may include a transparent conductive material, e.g., indium tin oxide (ITO) or indium zinc oxide (IZO). Preferably, the central electrode 206, the plurality of first electrodes 208 and the plurality of second electrodes 210 may be formed from a same layer of transparent conductive pattern layer to enhance the position precision and the yield rate and to reduce the thickness as well as manufacturing complications of the panel.

In the embodiment, the main bodies 206a of the central electrodes 206 of the touch sensing groups 204 has a continuous and regular and wavy contour on the substrate 102, extend towards one side of the substrate 102, and are parallel to one another. Each main body 206a may have an even width, and include a first side and a second side opposite each other. For example, the main bodies 206a may have in a sinusoidal curved contour. Each of the main bodies 206a may include a plurality of first bent top portions 206b and a plurality of second bent top portions 206c. The first bent top portions 206b protrude towards the first electrodes 208, the second bent top portions 206c protrude towards the second electrodes 210, and the first bent top portions 206b and the second bent top portions 206c are sequentially alternately arranged. Further, a distance between the first bent top portions 206b and the second bent top portions 206c (i.e., twice the amplitude of the main bodies 206a having the sinusoidal curved contour) may be adjusted according to actual requirements. The contour of the main bodies of the present invention is not limited to the exemplary sinusoidal curved contour, and may be a triangular wave curved contour (i.e., a zigzag contour) in other embodiments, for example.

In the embodiment, each of the central electrodes 206 may further include a plurality of first strip portions 206d and a plurality of second strip portions 206e. In each central electrode 206, the first strip portions 206d protrude from the first side of the main body 206a along the second direction D2 to form the first edge S1, and the second strip portions 206e protrude from the second side of the main body 206a along the second direction D2 to form the second edge S2. In each of the touch sensing groups 204, the first electrodes 208a are disposed at the first side of the main body 206a, and are separated from one another. The first electrodes 208 are arranged along the second direction D2, and are separated from the central electrode 206. Further, the first electrodes 208 include a first inner edge IS1 facing the central electrode 206 and a first outer edge OS1 with the back facing the central electrode 206. The first inner edge IS1 is adaptively spaced from the first edge S1 of the central electrode 206. In one embodiment, the first inner edge IS1 of the first electrodes 208 has a contour identical to the contour of the first edge S1 of the central electrode 206. Thus, the first electrodes 208 are kept at same distances from the central electrode 206 to provide a consistent coupling capacitance value between the central electrodes 206 and the first electrodes 208.

In the embodiment, each of the first electrodes 208 includes a plurality of first gaps 208a. In each of the touch sensing groups 204, the first gaps 208a are disposed facing the central electrode 206, and each of the first strip portions 206d is disposed in one of the first gaps 208a. More specifically, each first strip portion 206d is disposed in one single first gap 208a, and each first gap 208a is disposed with one single first strip portion 206d therein. That is to say, the first strip portions 206d are respectively disposed in the first gaps 208a in a one-on-one corresponding relationship. Each of the first electrodes 208 may further include a plurality of third strip portions 208b. The first strip portions 206d and the third strip portions 206b in each of the touch sensing groups 204 are sequentially alternately arranged along the second direction D2, and the adjacent first strip portions 206d and third strip portions 206b are separated from one another.

Further, the second electrodes 210 are disposed at the second edge S2 of the main body 206a, and are separated from one another. The second electrodes 210 are arranged along the second direction D2, and are separated from the central electrode 206. Further, the second electrodes 210 include a first inner edge IS2 facing the central electrode 206 and a second outer edge OS2 having the back facing the central electrode 206. The second inner edge IS2 is adaptively separated from the second edge S2 of the central electrode 206. In one embodiment, the second inner edge IS2 of the second electrodes 206 have a contour identical to the contour of the second edge S2 of the central electrode 206. Thus, the second electrodes 210 are kept at same distances from the central electrode 206 to provide a consistent coupling capacitance value between the central electrodes 206 and the second electrodes 210. Preferably, the distance between the second inner edge IS2 and the second edge S2 may be equal to the distance between the first inner edge IS1 and the first edge S1.

In the embodiment, each of the second electrodes 210 may include a plurality of second gaps 210a. In each of the touch sensing groups 204, the second gaps 210 are disposed facing the central electrode 206, and each of the second strip portions 206e is disposed in one of the second gaps 210a. More specifically, each second strip portions 206e is disposed in one single second gaps 210a, and each second gap 210a is disposed with one single second strip 206e therein. That is to say, the second strip portions 206e are respectively disposed in the second gaps 210a in a one-on-one corresponding relationship. More specifically, each of the second electrodes 210 may include a plurality of fourth strip portions 210b. The second strip portions 206e and the fourth strip portions 210b of each of the touch sensing groups 204 are sequentially alternately arranged along the second direction D2, and the adjacent second strip portions 206e and fourth strip portions 210b are separated from one another.

Each of the touch sensing groups 204 may further include a plurality of first conducting lines 212 and a plurality of second conducting lines 214. Each first conducting line 212 electrically connects to one of the first electrodes 208, and each second conducting line 214 electrically connects to one of the second electrodes 210. More specifically, each first conducting line 212 electrically connects to one single first electrode 208, and each first electrode 208 electrically connects to one single conducting line 212. Similarly, each second conducting line 214 electrically connects to one single second electrode 210, and each second electrode 210 also electrically connects to one single second conducting line 214. That is to say, the first conducting lines 212 respectively electrically connect to the first electrodes 208 in a one-on-one corresponding relationship, and the second conducting lines 214 respectively electrically connect to the second electrodes 210 in a one-on-one corresponding relationship. Details of the first conducting lines 212 and the second conducting lines 214 of the embodiment are identical to those of the first embodiment, and shall be omitted herein. The width W of each of the touch sensing groups 204 in the first direction D1 may be defined as the distance between an outermost edge of the outermost first conducting line 212 and the outermost edge of the outermost second conducting line 214. In the embodiment, a length L1 of the first electrodes 208 in the second direction D2 and a length L2 of the second electrodes 210 in the second direction D2 may be greater than the width W of the touch sensing groups 204. Preferably, the width W of the touch sensing groups 204 in the first direction D1 is smaller than the width of a predetermined touching object to help identifying the position of the predetermined touching object. For example, the predetermined touching object on the touch panel 200 may be a finger, the width W of the touch sensing groups 204 in the first direction D1 may be 5 mm, and the length of the first electrodes 208 in the second direction D2 and the length L2 of the second electrodes 210 in the second direction D2 may be greater than 5 mm, e.g., 7 mm.

In the embodiment, the center of the first inner edge IS1 of one of the first electrodes 208 may be disposed correspondingly to one of the second bent top portions 206c. Each of the first electrodes 208 may further include two first short edges SS1 disposed between the first inner edge IS1 and the first outer edge OS1. The first short edges SS1 are connected to the first inner edge IS1 and the first outer edge OS1, have a length shorter than those of the first inner edge IS1 and the first outer edge OS1, and face another adjacent first electrode 208. Further, the first short edges SS1 are disposed correspondingly to one of the first bent top portions 206b. Similarly, the center of the second inner edge IS2 of the one of the second electrodes 210 is disposed correspondingly to one of the first bent top portions 206b. Each of the second electrodes 210 may further include two second short edges SS2 disposed between the second inner edge IS2 and the second outer edge OS2. The second short edges SS2 are connected to the second inner edge IS2 and the second outer edge OS2, have a length shorter than those of the second inner edge IS2 and the second outer edge OS2, and face another adjacent second electrode 210. The second short edges SS2 are disposed correspondingly to one of the second bent top portions 206c. Thus, the widths of the first electrodes 208 and the second electrodes 210 in the first direction D1 may gradually decrease as the first electrodes 208 and the second electrodes 210 get closer to the upper short edge and the lower short edge. That is to say, the second electrodes 210 may selectively have a same contour and size as the first electrodes 208, and the first electrodes 208 and the second electrodes 210 may be in a staggered arrangement, such that one of the first electrodes 208 overlaps two adjacent second electrodes 210 in the first direction D1. Preferably, overlapping regions of the first electrode 208 and the two adjacent second electrodes 210 may be equal. Taking the first electrode 208N of the first electrodes 208 of each of the touch sensing groups 204 for example, the first electrode 208N corresponds to two adjacent second electrodes 210M and 210N, the first electrode 208N and the second electrode 210M have a first overlapping length O1 in the first direction D1, the first electrode 208N and the second electrode 210N have a second overlapping length O2 in the first direction D1, and the first overlapping length O1 is substantially equal to the second overlapping length O2. Thus, the touch panel 200 of the embodiment is capable of reducing the numbers of the first conducting lines 212 and the second conducting lines 214 without altering the sensitivity of the touch panel 200, or is capable of enhancing the sensitivity of the touch panel 200 without changing the lengths of the first electrodes 208 and the second electrodes 210 in the second direction D2.

Figure 6:
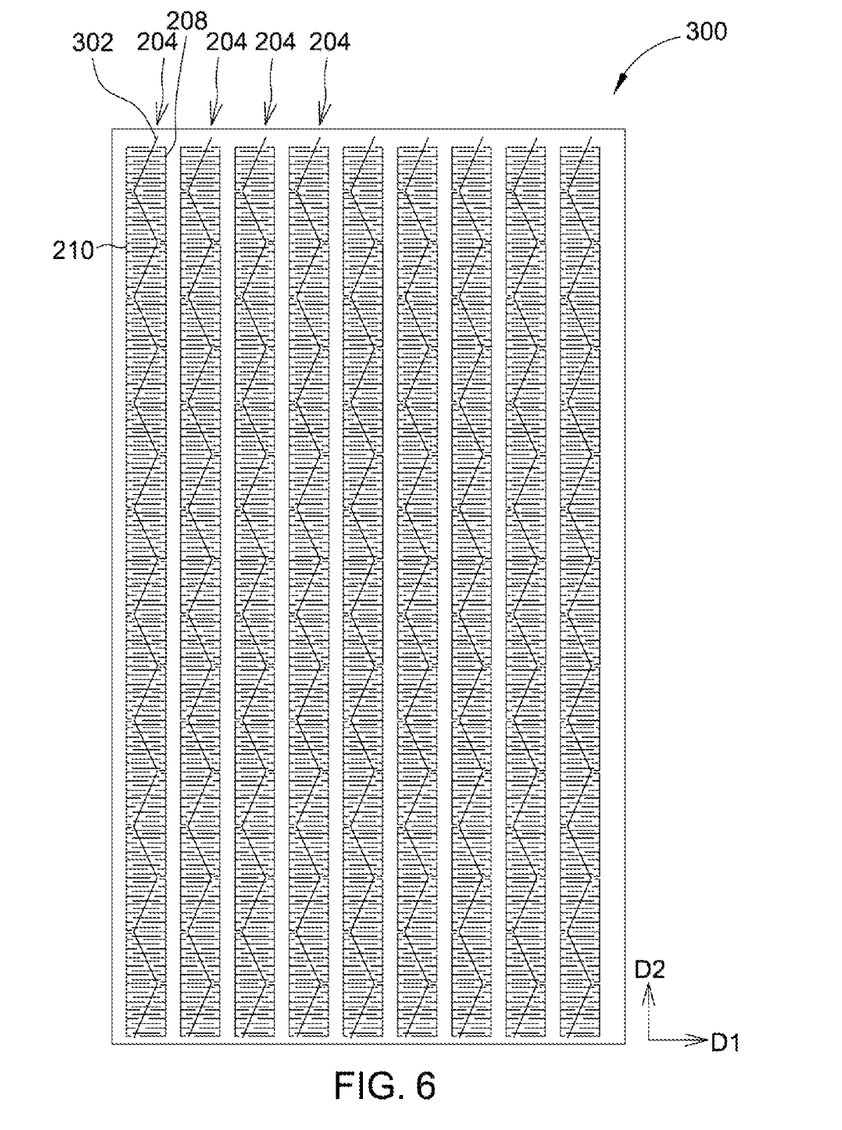
FIG. 6 is a top view of a touch panel according to a third embodiment of the present invention.

FIG. 6 shows a top view of a touch panel according to a third embodiment of the present invention. As shown in FIG. 6, compared to the second embodiment, main bodies 302 of a touch panel 300 of the embodiment may have a triangular wave curved contour.

Figure 7:
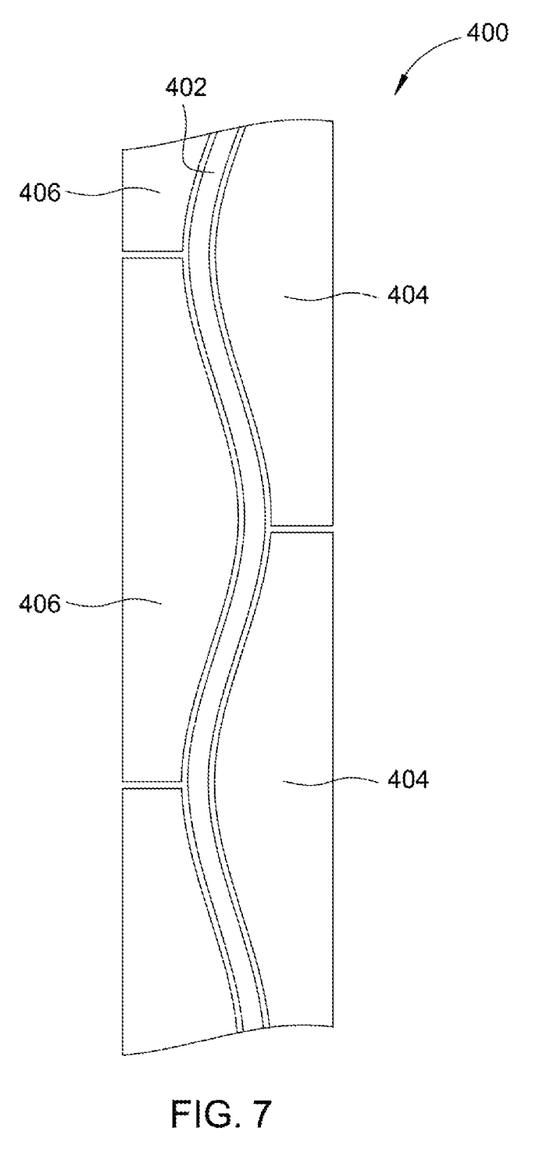
FIG. 7 is a top view of a touch panel according to a fourth embodiment of the present invention.

FIG. 7 shows a top view of a touch panel according to a fourth embodiment of the present invention. As shown in FIG. 7, compared to the first embodiment, a central electrode 402 of a touch panel 400 of the embodiment may exclude first strip portions and second strip portions, and a first electrode 404 and a second electrode 406 may have different first gaps and second gaps, respectively. The third embodiment of the present invention may be applied to this embodiment.

Figure 8:
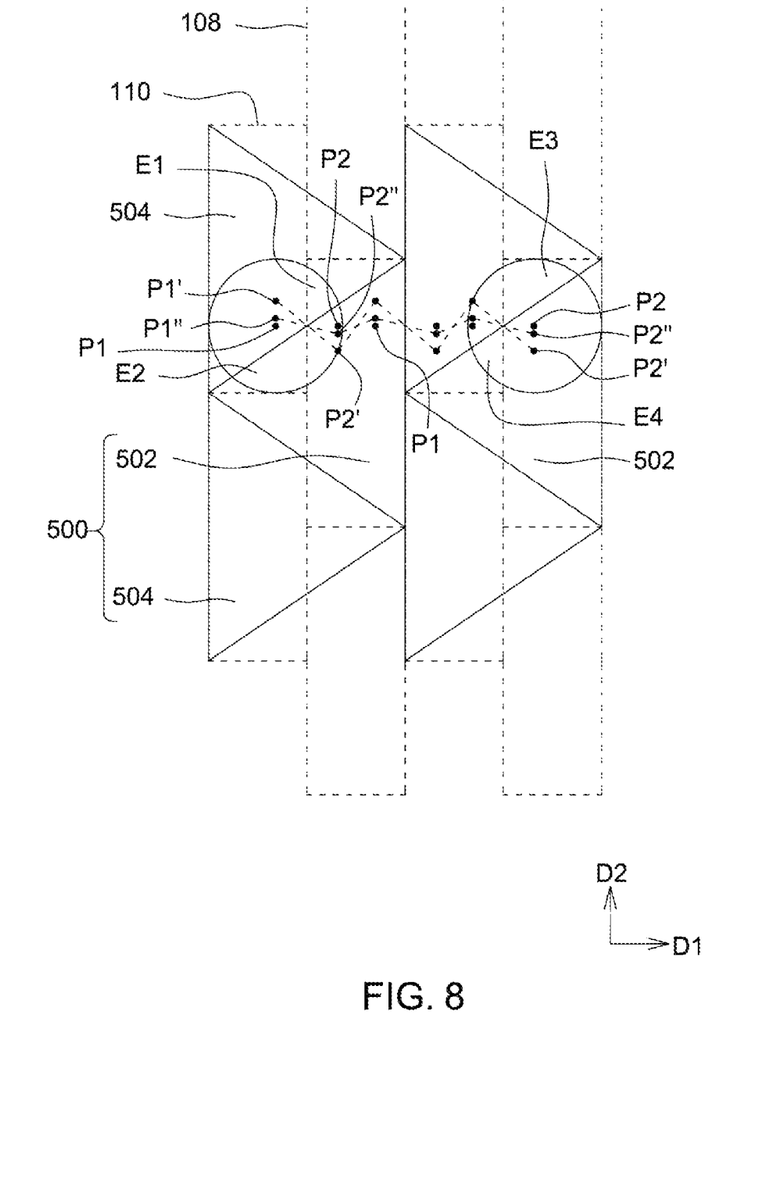
FIG. 8 is a schematic diagram of a position change that a touch panel including a main body in a bent shape detects for a touching object moving along a straight line parallel to a first direction on the touch panel according to an embodiment of the present invention.

Details of how this embodiment improves the issue that the movement track of a touching object detected by the touch panel 100 does not match the actual movement track of the touching object are given below. FIG. 8 shows a schematic diagram of a position change that the touch panel 500 including main bodies in a bent contour detects for a touching object moving along a straight line parallel to the first direction on the touch panel 500. To clearly show overlapping regions between the touching object and the electrodes, FIG. 8 depicts a situation where first electrodes 502 and second electrodes 504 do not include first gaps and second gaps, and the main bodies have a triangular wave curved contour, for example. It should be noted that, the above examples are not to be construed as limitations to the present invention. As shown in FIG. 8, the center of the touching object moves in a straight line along the first direction D1 from P1 to P2. When the center of the touching object is located at P1, an overlapping area of the touching object and the second electrode 504 is greater than an overlapping area of the touching object and the first electrode 502. Thus, a position P1" detected by the touch panel 500 is displaced upwards along the second direction D2 relative to the center P1 of the touching object. As the main bodies have a triangular wave curved contour and the first electrodes 502 and the second electrodes 504 have triangular contours, compared to the overlapping area of the touching object having a center located at P1 and the second electrode 110 of the touch panel 100, the overlapping area of the touching object having a center located at P1 and the second electrode 504 of the touch panel 500 further includes an additional region E1 but excludes a region E2, with the region E1 being smaller than the region E2. In other words, the overlapping area of the touching object having a center located at P1 and the second electrode 504 of the touch panel 500 is smaller than the overlapping area of the touching object having a center located at P1 and the second electrode 110 of the touch panel 100, and therefore the position P1" detected by the touch panel 500 is closer to the actual position P1 of the center of the touching object than the position P1' detected by the touch panel 100. On the other hand, when the center of the touching object is located at P2, the overlapping area of the touching object and the second electrode 504 is smaller than the overlapping area of the touching object and the first electrode 502, and therefore the position P2" detected by the touch panel 500 is displaced downwards along the second direction D2 relative to the center P2 of the touching object. Compared to the overlapping area of the touching object having a center located at P2 and the second electrode 110 of the touch panel 100, the overlapping area of the touching object having a center located at P2 and the second electrode 504 of the touch panel 500 further includes an additional region E3 but excludes a region E4, with the region E3 being greater than the region E4. In other words, the overlapping area of the touching object having a center located at P2 and the second electrode 504 of the touch panel 500 is larger than the overlapping area of the touching object having a center located at P2 and the second electrode 110 of the touch panel 100, and therefore the position P" detected by the touch panel 500 is closer to the actual position P2 of the center of the touching object than the position P2' detected by the touch panel 100. It is concluded that, the movement track of the touching object detected by the touch panel 500 is closer to the actual movement track of the touching object than the movement track detected by the touch panel 100, thereby improving the touch quality and accuracy of the touch panel.

In conclusion, in addition to providing higher precision in relative positions of the electrodes, reduced thickness of the touch panel and enhanced sensitivity of the touch panel or reduced numbers of the conducting lines, by further designing the main bodies of the central electrodes as having wavycontours, the touch panel of the present invention improves the issue that the movement track of a touching object detected by the touch panel does not match the actual movement track of the touching object to further improve the touch quality and accuracy of the touch panel.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch panel, comprising:
a substrate; and
a plurality of touch sensing groups, arranged along a first direction on the substrate, each of the touch sensing groups comprising:
a central electrode, comprising a main body, a first edge and a second edge, the main body having a wavy contour and extending towards one side of the substrate, the main body comprising a first side and a second side opposite to each other, the first edge being located at the first side of the main body and the second edge being located at the second side of the main body, wherein the main body comprises a plurality of first bent top portions and a plurality of second bent top portions, the first bent top portions and the second bent top portions are sequentially alternately arranged;
a plurality of first electrodes, disposed at the first side of the main body along a second direction, each of the first electrodes comprising a first inner edge adaptively spaced from the first edge of the central electrode, and a first short edge connected to the first inner edge, wherein a center of the first inner edge is disposed correspondingly to one of the second bent top portions, and the first short edge is adjacent to another first electrode of the first electrodes and is disposed correspondingly to one of the first bent top portions; and
a plurality of second electrodes, disposed at the second side of the main body along the second direction, each of the second electrodes comprising a second inner edge adaptively spaced from the second edge of the central electrode;

wherein, one first electrode of the first electrodes overlaps two adjacent second electrodes of the second electrodes in the first direction; and wherein the first bent top portions protrude towards the first electrodes, and the second bent top portions protrude towards the second electrodes.

2. The touch panel according to claim 1, wherein the central electrode of each of the touch sensing groups further comprises a plurality of first strip portions and a plurality of second strip portions, the first strip portions of the central electrode protrude from the first side of the main body to form the first edge, and the second strip portions of the central electrode extend from the second side of the main body to form the second edge.

3. The touch panel according to claim 2, wherein each of the first electrodes of each of the sensing groups comprises a plurality of first gaps, the first gaps are disposed facing the first edge of the central electrode, each of the first strip portions of the central electrode is disposed in single one of the first gaps, and each of the first gaps is disposed with single one of the first strip portions therein.

4. The touch panel according to claim 3, wherein each of the second electrodes of each of the sensing groups comprises a plurality of second gaps, the second gaps are disposed facing the second edge of the central electrode, each of the second strip portions of the central electrodes is disposed in single one of the second gaps, and each of the second gaps is disposed with single one of the second strip portions therein.

5. The touch panel according to claim 1, wherein one second electrode of the second electrodes of each of the touch sensing groups further comprises a second short edge connected to the second inner edge of the second electrode, a center of the second short edge of the second electrode is disposed correspondingly to the first bent top portions, and the second short edge is adjacent to another second electrode of the second electrodes and is disposed correspondingly to one of the second bent top portions.

6. The touch panel according to claim 1, wherein for each of the touch sensing groups, the first electrode of the first electrodes and one second electrode of the two adjacent second electrodes of the second electrodes have a first overlapping length in the first direction, the first electrode and the other second electrode of the two adjacent second electrodes of the second electrodes have a second overlapping length in the second direction, and the first overlapping direction is substantially equal to the second overlapping length.

7. The touch panel according to claim 1, wherein the main body of the central electrode of each of the touch sensing groups has a sinusoidal curved contour or a triangular wave curved shape.

8. The touch panel according to claim 1, wherein a length of each of the first electrodes of each of the touch sensing groups in the second direction is greater than a width of each of the touch sensing groups in the first direction, and a length of each of the second electrodes of each of the touch sensing groups in the second direction is greater than the width of each of the touch sensing groups in the first direction.

9. The touch panel according to claim 1, wherein a width of each of the touch sensing groups in the first direction is smaller than a width of a predetermined touching object.

10. The touch panel according to claim 1, wherein each of the touch sensing groups further comprises a plurality of first conducting lines and a plurality of second conducting lines, each of the first conducting lines connects to single one of the first electrodes, each of the first electrodes connects to single one of the first conducting lines, each of the second conducting lines connects to single one of the second electrodes, and each of the second electrodes connects to single one of the second conducting lines.

11. The touch panel according to claim 1, wherein the central electrodes, the first electrodes and the second electrodes are formed from a same transparent conductive pattern layer.

* * * * *